Jan. 12, 1932.   V. BENDIX ET AL   1,840,829

BRAKE

Filed Nov. 25, 1927

INVENTOR
VINCENT BENDIX
LUDGER E. LA BRIE
BY
ATTORNEY

Patented Jan. 12, 1932

1,840,829

UNITED STATES PATENT OFFICE

VINCENT BENDIX, OF CHICAGO, ILLINOIS, AND LUDGER E. LA BRIE, OF SOUTH BEND, INDIANA, ASSIGNORS TO BENDIX BRAKE COMPANY, OF SOUTH BEND, INDIANA, A CORPORATION OF ILLINOIS

BRAKE

Application filed November 25, 1927. Serial No. 235,428.

This invention relates to brakes, and is illustrated as embodied in an internal expanding brake for an automobile. An object of the invention is to simplify the operating mechanism of the brake, and preferably to adapt it for use with a brake of the type having a servo shoe acting on a friction device which shifts its anchorage, e. g. from one end to the other, when the drum reverses its direction of rotation.

We prefer to arrange the brake-applying means between the anchorages of the brake, in such a manner as to act on one end of the friction device and on the servo shoe, the servo shoe being arranged to act on the other end of the friction device. In the illustrated arrangement, the servo shoe overlaps the ends of the friction device, for example being formed with two webs straddling the web of the main friction device. A thrust part may be mounted between the webs of the servo shoe, in which case the applying means may conveniently include a cam extending radially outward between the two webs of the servo shoe, and between the thrust part and the end of the main friction device.

The above and other objects and features of the invention, including a novel arrangement of operating means for the described cam, and various other novel and desirable structural designs, will be apparent from the following description of one illustrative embodiment shown in the accompanying drawings, in which.

Figure 1:
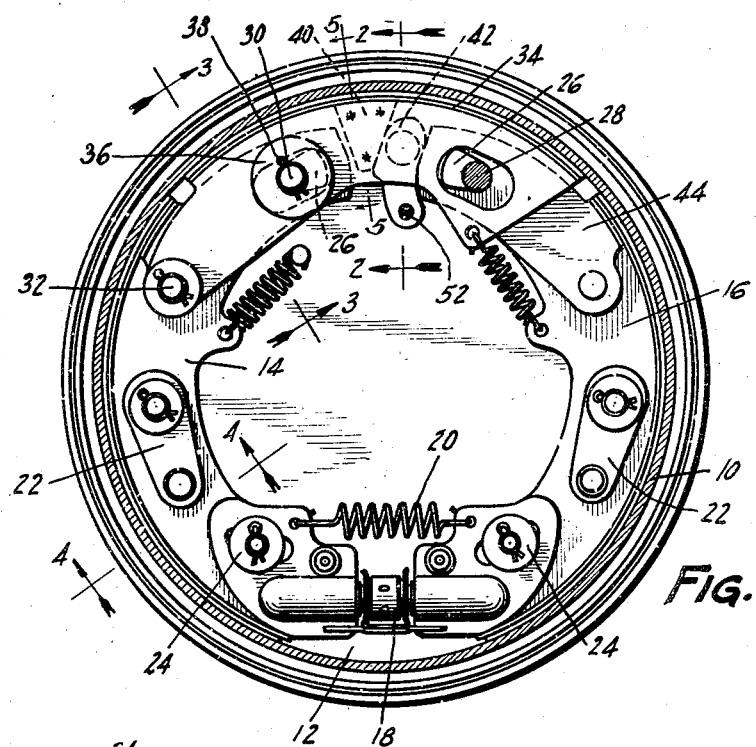
Figure 1 is a vertical section through the brake, just inside the head of the brake drum, and showing the brake shoes in side elevation.
Figure 2:
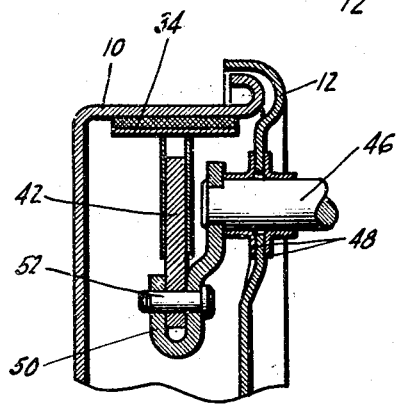
Figure 2 is a partial section through the applying means, on the line 2—2 of Figure 1.
Figure 4:
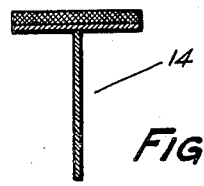
Figure 4 is a section through one of the shoes making up the main friction device, on the line 4—4 of Figure 1.
Figure 3:
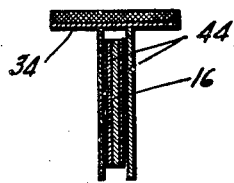
Figure 3 is a section through overlapping parts of the shoes, on the line 3—3 of Figure 1.
Figure 5:
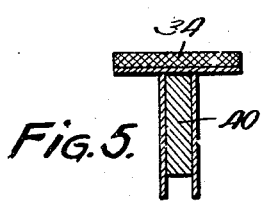
Figure 5 is a sectional view through the web of the servo shoe and thrust block secured between the web.

The brake selected for illustration includes a rotatable drum 10, at the open side of which is a stationary support such as a backing plate 12, and within which is housed a shiftable or floating friction device which is shown as including two shoes 14 and 16 connected by a suitable expansion joint 18 which can be adjusted to compensate for wear. The shoes are held toward this joint by a tension coil spring 20. Suitable positioning devices 22, of any desired type, may be provided to determine the idle or released positions of the shoes. The shoes are also shown provided with steady-rests 24 of any desired form.

At their upper ends, shoes 14 and 16 are formed with slots 26, or are otherwise formed, for engagement with two anchorage devices such as posts 28 and 30 fixedly mounted on the backing plate 12. When the drum is turning clockwise in Figure 1, when the brake is applied, the torque of the brake is taken on the anchor 30; when the drum is turning counter-clockwise the torque is taken on the anchor 28.

According to an important feature of the present invention, shoe 14 is connected adjacent its upper end, by means such as a pivot 32, with one end of a novel servo shoe 34 shown as having two spaced webs straddling the single webs of the shoes 14 and 16 at the upper ends of the shoes, i. e. at the opposite ends of the friction device made up of these two shoes. A washer 36 on the end of each of the anchors, held for example by a cotter pin 38, may be provided to hold the servo shoe laterally.

The servo shoe preferably has a plate 40, or other thrust part, spot-welded or otherwise secured between its spaced webs between the ends of shoes 14 and 16. The illustrated applying means includes a floating device such as a cam 42 extending upwardly between the webs of shoe 34, and between the thrust part 42 and the end of shoe 16. This brings the applying device between the two anchors 28 and 30. The end of shoe 16 may be reinforced by plates 44 welded to its opposite sides, and increasing the bearing surfaces for anchor 28 and cam 42.

The novel means for operating cam 42, or an equivalent applying device, is shown as including a shaft 46 opposite the upper end of cam 42 and journaled in a bearing formed in stampings 48 welded to opposite sides of backing plate 12, and having at its end a novel stamped arm 50 looped back, at its inner end, over the inner end of the cam 42. A pivot 52 may be provided to connect cam 42 and arm 50.

With application of the cam 42 the servo shoe and shoe 16 are forced apart and with the drum turning counterclockwise the braking torque is taken by the anchor 28. The servo shoe in the operation functions as an aid in applying the shoe 14 of the friction device, being energized by the revolving drum. The shoe 14 in turn, aids in the application of shoe 16. With clockwise drum movement the shoe 16 in effect functions as a servo shoe to aid in applying shoe 14, the torque being taken by the anchor pin 30. By virtue of its floating arrangement with the brake shoes, the operation of the cam is unaffected by this shifting of the brake.

While one illustrative embodiment has been described in detail, it is not our intention to limit the scope of the invention to that particular embodiment, or otherwise than by the terms of the appended claims.

We claim:

1. A brake comprising, in combination, a drum, a pair of anchoring parts spaced a short distance from each other at one side of the drum, a friction device within the drum and arranged to anchor at one end on one of said parts when the drum is turning in one direction and to anchor at the other end on the other of said parts when the drum is turning in the other direction, a servo shoe overlapping said ends and operatively engaging the friction device adjacent one of said ends, and applying means between the anchoring parts and arranged to act on the servo shoe and on the friction device adjacent the other of said ends.

2. A brake comprising, in combination, a drum, a pair of anchoring parts spaced a short distance from each other at one side of the drum, a friction device within the drum and arranged to anchor at one end on one of said parts when the drum is turning in one direction and to anchor at the other end on the other of said parts when the drum is turning in the other direction, a servo shoe operatively engaging the friction device adjacent one of said ends, and applying means between the anchoring parts and arranged to act on the servo shoe and on the friction device adjacent the other of said ends.

3. A brake comprising, in combination, a drum, a pair of anchoring parts spaced a short distance from each other at one side of the drum, a friction device within the drum and arranged to anchor at one end on one of said parts when the drum is turning in one direction and to anchor at the other end on the other of said parts when the drum is turning in the other direction, a servo shoe having one end pivotally connected to one end of the friction device and its other end straddling the other end of the friction device, and applying means between the anchoring parts and arranged to act on the servo shoe.

4. A brake comprising, in combination, a drum, a pair of anchoring parts spaced a short distance from each other at one side of the drum, a friction device within the drum and arranged to anchor at one end on one of said parts when the drum is turning in one direction and to anchor at the other end on the other of said parts when the drum is turning in the other direction, a servo shoe pivotally connected to the friction device adjacent one end, and applying means between the anchoring parts and arranged to act on the servo shoe and on the other of the ends of the friction device.

5. A brake comprising, in combination, a drum, a friction device engageable with the drum and anchoring at one end when the drum is turning in one direction and at the other end when the drum is turning in the other direction, a servo shoe engageable with the same zone of the drum as the friction device and arranged to act on one end of the friction device, and applying means acting on the other end of the friction device and on the servo shoe approximately at its center.

6. A brake comprising, in combination, a drum, a friction device engageable with the drum and anchoring at one end when the drum is turning in one direction and at the other end when the drum is turning in the other direction, a servo shoe overlapping the ends of the friction device and arranged to act on one end of the friction device, and applying means acting on the other end of the friction device and on the servo shoe approximately at its center.

7. A brake comprising, in combination, a shoe having a single web, a shoe having two webs straddling said single web and having a thrust member between said webs, and a cam between said two webs and acting in opposite directions on the end of the single web and on said thrust member.

8. A brake comprising, in combination, a shoe having a single web, a shoe having two webs straddling said single web and having a thrust member between said webs, a cam projecting radially between said two webs and acting in opposite directions on the end of the single web and on said thrust member and which has an operating part inside of said shoes, and applying means acting on the operating part.

In testimony whereof, we have hereunto signed our names.

VINCENT BENDIX.
LUDGER E. LA BRIE.